United States Patent
Tomizawa et al.

(10) Patent No.: US 12,485,103 B2
(45) Date of Patent: Dec. 2, 2025

(54) INSULIN SECRETION-PROMOTING AGENT AND BLOOD SUGAR LEVEL IMPROVER USING SAME, DIABETES IMPROVER, AND FOOD

(71) Applicants: REFINE HOLDINGS CO., LTD., Gifu (JP); NATIONAL UNIVERSITY CORPORATION KUMAMOTO UNIVERSITY, Kumamoto (JP)

(72) Inventors: Kazuhito Tomizawa, Kumamoto (JP); Fan-Yan Wei, Kumamoto (JP); Makoto Tsuboi, Tokyo (JP); Kunimitsu Kaya, Tokyo (JP)

(73) Assignees: REFINE HOLDINGS CO., LTD., Gifu (JP); NATIONAL UNIVERSITY CORPORATION KUMAMOTO UNIVERSITY, Kumamoto (JP)

( * ) Notice: Subject to any disclaimer, the term of this patent is extended or adjusted under 35 U.S.C. 154(b) by 796 days.

(21) Appl. No.: 17/779,904

(22) PCT Filed: Nov. 27, 2020

(86) PCT No.: PCT/JP2020/044192
§ 371 (c)(1),
(2) Date: May 25, 2022

(87) PCT Pub. No.: WO2021/107084
PCT Pub. Date: Jun. 3, 2021

(65) Prior Publication Data
US 2023/0014301 A1    Jan. 19, 2023

(30) Foreign Application Priority Data
Nov. 27, 2019    (JP) .................................. 2019-213850

(51) Int. Cl.
*A61K 31/23* (2006.01)
*A23D 9/00* (2006.01)
(Continued)

(52) U.S. Cl.
CPC ................. *A61K 31/23* (2013.01); *A23D 9/00* (2013.01); *A23L 33/115* (2016.08); *A23L 33/40* (2016.08); *A61P 3/10* (2018.01); *A23V 2002/00* (2013.01)

(58) Field of Classification Search
CPC .......... A61K 31/23; A61K 36/02; A23D 9/00; A23D 9/02; A23L 33/115; A23L 33/40;
(Continued)

(56) References Cited

U.S. PATENT DOCUMENTS

2011/0201558 A1   8/2011  Roe et al.
2019/0255129 A1*  8/2019  Dong ..................... A61Q 19/08

FOREIGN PATENT DOCUMENTS

JP   2013-516416 A   5/2013
JP   2016-89025 A    5/2016
(Continued)

OTHER PUBLICATIONS

ISR for PCT/JP2020/044192, dated Jan. 19, 2021.
(Continued)

*Primary Examiner* — Deborah D Carr
(74) *Attorney, Agent, or Firm* — GREENBLUM & BERNSTEIN, P.L.C.

(57) ABSTRACT

Provided is an insulin secretion-promoting agent comprising, as an active ingredient, a triglyceride represented by the following formula (I):

(Continued)

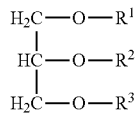

(I)

wherein $R^1$, $R^2$ and $R^3$ each denotes a saturated fatty acid residue, at least one of which is a pentadecanoic acid residue. An insulin secretion-promoting action of the pentadecanoic acid triglyceride at the time of elevated blood glucose level is discovered, and pharmaceuticals and health foods for improving blood glucose level and diabetes are provided using this triglyceride.

8 Claims, 2 Drawing Sheets

(51) Int. Cl.
*A23L 33/00* (2016.01)
*A23L 33/115* (2016.01)
*A61P 3/10* (2006.01)

(58) Field of Classification Search
CPC ........ A61P 3/10; A61P 43/00; A23V 2002/00; C11B 1/04; C11B 1/10
See application file for complete search history.

(56) References Cited

FOREIGN PATENT DOCUMENTS

JP 2017200910 A * 11/2017
JP 2019-518034 A 6/2019

OTHER PUBLICATIONS

Written Opinion for PCT/JP2020/044192, dated Jan. 19, 2021 (w/ translation).
Shimomura et al., "Effects of Squat Exercise and Branched-Chain Amino Acid Supplementation on Plasma Free Amino Acid Concentrations in Young Women", J. Nutr. Sci. Vitaminol, 55:288-291 (2009).
Pfeuffer et al., "Pentadecanoic and Heptadecanoic Acids: Multifaceted Odd-Chain Fatty Acids.", Adv Nutr., 7:730-734 (2016).

* cited by examiner

INSULIN SECRETION-PROMOTING AGENT AND BLOOD SUGAR LEVEL IMPROVER USING SAME, DIABETES IMPROVER, AND FOOD

CROSS REFERENCE

This application claims priority based on Japanese Patent Application No. 2019-213850 filed in Japan on Nov. 27, 2019, the entire contents of which are incorporated herein by reference in their entirety. In addition, all the contents described in all patents, patent applications, and documents cited in the present application are incorporated herein by reference in their entirety.

TECHNICAL FIELD

The present invention relates to an insulin secretion-promoting agent, as well as to a blood sugar level improver using same, a diabetes improver, and foods such as health foods, foods with functional claims, and foods for specified health uses.

BACKGROUND ART

Diabetes mellitus is a chronic disease in which blood glucose levels rise constantly due to inadequate insulin secretion or reduced insulin sensitivity, and the functions of various organs such as the eyes and kidneys are impaired. In Japan, the number of people with diabetes, including those suspected to have diabetes, is about 10 million, and the number of diabetes patients worldwide is about 400 million, and the number continues to increase. In the past, insulin secretion-promoting agents such as sulfonylureas (SUs) and DDP4 inhibitors have been widely used to treat diabetic patients. However, the SU agents have the risk of hypoglycemia due to excessive insulin secretion, while the DDP4 inhibitors are somewhat less effective in stimulating insulin secretion. Therefore, there is still a fierce competition for the development of new therapeutic agents with insulin secretion-promoting effects. However, at present, no effective ingredient that promotes insulin secretion has been found to replace the SU agents and DDP4 inhibitors.

Incidentally, there is a known method by using algae of the genus *Aurantiochytrium* of producing a mixture of triglycerides containing odd-chain fatty acids as major components and triglycerides containing highly unsaturated fatty acids (see, for example, Patent literature 1). Most of the fatty acids in the bodies of mammals and birds are fatty acids with an even number of carbons, and odd-chain fatty acids are present in only 0.1 to a few percent of the body fat, muscles, organs, milk, and eggs of humans and domestic animals and poultry. Odd-chain fatty acids, like even-chain fatty acids, can be used as an energy source through β-oxidation, but they also function to maintain the TCA cycle normally by converting propionyl-CoA, the last product of odd-chain fatty acids in the β-oxidation system, to succinyl-CoA, which is replenished to the TCA cycle. It is expected to reduce muscle pain caused by muscle damage during and after exercise (see Non-patent literature 1) and to improve mitochondrial energy metabolism, thereby improving metabolic diseases and aging (see Non-patent literature 2).

There are also reports of therapeutic methods for Alzheimer's disease (AD) and aging by using a ketone producing diet containing odd-chain triglycerides to improve cognitive function, increase circulating ketone bodies, and decrease amyloid-β (Aβ) deposition in AD patients (see Patent literature 2). However, they were not yet known to be effective in the field of diabetes.

PRIOR ART DOCUMENT

Patent Literature

[Patent literature 1] JP2016-89025 A
[Patent literature 2] JP2013-516416 A

Non-Patent Literature

[Non-patent literature 1] Shimomura Y. et al., Effects of squat exercise and branched-chain amino acid supplementation on plasma free amino acid concentrations in young women, J. Nutr. Sci. Vitaminol. (2009) 55, 288-291.

[Non-patent literature 2] Pfeuffer M. and Jaudszus A. (2016) Pentadecanoic and Heptadecanoic Acids: Multifaceted Odd-Chain Fatty Acids, Adv Nutr. (2016) 15; 7(4): 730-4.

SUMMARY OF INVENTION

Problem to be Solved by the Invention

Therefore, in view of the current situation described above, the present invention is intended to provide novel insulin secretion-promoting agent effective for preventing or improving diabetes, as well as blood glucose level ameliorating agent, diabetes ameliorating agent, and food products using the same.

Means for Solving the Problem

As a result of intensive research and investigation to solve the above problems, we, the applicants discovered that pentadecanoic acid triglyceride (PdATG) acts on pancreatic beta cells (β-cells) to promote insulin secretion, and came to the conclusion that the use of the pentadecanoic acid triglyceride having this insulin secretion-promoting effect as an active ingredient can provide novel pharmaceuticals and foods effective for preventing or improving diabetes could be obtained, leading to the completion of this invention.

That is, the first aspect of the invention to solve the above problem is an insulin secretion-promoting agent comprising, as an active ingredient, a triglyceride represented by the following formula (I):

wherein $R^1$, $R^2$ and $R^3$ each denotes a saturated fatty acid residue, at least one of which is a pentadecanoic acid residue.

In one embodiment of the insulin secretion-promoting agent according to the present invention, it is preferable that $R^1$ and $R^2$ or $R^1$ and $R^3$ of the triglyceride represented by the formula (I) are pentadecanoic acid residues.

In another embodiment of the insulin secretion-promoting agent according to the present invention, any one of $R^1$, $R^2$ and $R^3$ may be a myristic acid residue (C14), a palmitic acid residue (C16) or a margaric acid residue (C17).

In another preferred embodiment of the insulin secretion-promoting agent according to the present invention, it may comprise a triglyceride represented by the formula (I) wherein $R^1$, $R^2$ and $R^3$ all denote pentadecanoic acid residues, and a triglyceride represented by the formula (I) wherein any two of $R^1$, $R^2$ and $R^3$ are pentadecanoic acid residues and another is a myristic acid residue or a palmitic acid residue.

Furthermore, in yet another preferred embodiment of the insulin secretion-promoting agent according to the present invention, the triglyceride represented by the formula (I) may be derived from algae of the genus *Aurantiochytrium* or *Schizochytrium*, and wherein $R^1$, $R^2$ and $R^3$ each denotes a saturated fatty acid residue, at least one of which is a pentadecanoic acid residue.

The second aspect of the present invention is a blood sugar level improver comprising the triglyceride represented by the formula (I) as an active ingredient.

The third aspect of the present invention is a diabetes improver comprising the triglyceride represented by the formula (I) as an active ingredient.

Furthermore, the fourth aspect of the present invention is a food product comprising the triglyceride comprising the triglyceride according to any one of claims 1 to 5 as an active ingredient. This food is preferably used, for example, as a health food, functional food, or food for specified health uses, to improve people with elevated blood glucose levels.

Effects of the Invention

The pentadecanoic acid triglyceride according to the present invention can be used to improve elevated blood glucose levels and is useful as a health food and medicine for this purpose.

EMBODIMENT FOR CARRYING OUT THE INVENTION

Hereinafter, the pentadecanoic acid triglyceride, which is the active ingredient of the present invention, will be described first, and then the production method and various uses thereof will be described.

(Active Ingredient)

In this specification, "pentadecanoic acid triglyceride" means an ester of at least one pentadecanoic acid and a glycerol, and includes a triglyceride wherein at least one, preferably any two, of $R^1$, $R^2$ and $R^3$ shown in Formula (I) below, e.g., $R^1$ and $R^2$ or $R^1$ and $R^3$, and even more preferably $R^1$, $R^2$ and $R^3$, are pentadecanoic acid residues. The binding position(s) of pentadecanoic acid(s) to the glyceride may be any of the positions 1 to 3.

In the formula, if at least one of the saturated fatty acid residues represented by $R^1$, $R^2$ and $R^3$ is a pentadecanoic acid residue, the other two may independently be saturated fatty acid residues other than pentadecanoic acid residues. "Saturated fatty acid" is a general term for fatty acids that do not have double or triple bonds within the molecule and is represented by the chemical formula $C_nH_{2n+1}COOH$. Although not particularly limited, in the chemical formula of this saturated fatty acid, n is, for example, an integer of 4 to 26, preferably an integer of 11 to 19, and more preferably an integer of 14 or 16. When one of saturated fatty acid residues represented by $R^1$, $R^2$ and $R^3$ is a pentadecanoic acid residue and the other two are saturated fatty acid residues other than pentadecanoic acid residue, these saturated fatty acids may be the same or different from each other. These saturated fatty acids can be straight-chain or branched saturated fatty acids. For example, linear saturated fatty acids, such as butyric acid (C4), valeric acid (C5), caproic acid (C6), enanthic acid (C7), caprylic acid (C8), pelargonic acid (C9), capric acid (C10), lauric acid (C12), myristic acid (C14), pentadecanoic acid (C15), palmitic acid (C16), margaric acid (C17), stearic acid (C18), arachidic acid (C20), behenic acid (C22), lignoceric acid (C24), and cerotic acid (C26), and branched saturated fatty acids such as 2-hexyl decanoic acid (C16), 13-methylpentadecanoic acid (C16), and 16-methylheptadecanoic acid (C18) are enumerated.

The pentadecanoic acid triglycerides in one preferred embodiment include both of a triglyceride of formula (I) above, where all of $R^1$, $R^2$ and $R^3$ are pentadecanoic acid residues, and a triglyceride of formula (I) above, where any two of $R^1$, $R^2$ and $R^3$ are pentadecanoic acid residues and the other one is a myristic acid residue or a palmitic acid residue. The content ratio of both in this mixture is not particularly limited, but the mass ratio is preferably 1:2 to 2:1 and more preferably approximately 1:1. In addition, each of these is contained in 10% or more by mass, preferably 20% or more by mass, relative to the total amount of triglycerides. Furthermore, it is more preferred that the mixture of triglycerides containing two or more residues of pentadecanoic acid contains more than 50% by mass of the oil or fat.

In a more preferred embodiment, the pentadecanoic acid triglyceride is represented by the following general formula (II) or (III).

-continued (III)

In formulas (II) and (III) above, R is a $C_{14}$-$C_{16}$ saturated fatty acid.

It is more preferable that the mixture of triglycerides containing two or more residues of pentadecanoic acid contains 50% by mass or more in the fat and oil, but even if the content of triglycerides containing two or more residues of pentadecanoic acid is 50% by mass or less, the objective can be achieved by increasing the amount of intake. Therefore, the active ingredient of the present invention may exist in the form of a mixture of triglycerides containing two or more residues of pentadecanoic acid, and is at least 1% by mass or more, preferably 50% by mass or more, and more preferably 90% by mass or more in purity relative to the total amount of triglycerides, thereby the mixture itself can exhibit its function as an active ingredient.

The active ingredient of the present invention may exist in the form of a mixture together with triglycerides other than the compound represented by the formula (I), and is at least 1% by mass, preferably 50% by mass or more, more preferably 90% by mass or more, based on the total amount of triglycerides, thereby the mixture itself can exert its function as an active ingredient.

(Action and Effect)

While the pentadecanoic acid triglyceride, the active ingredient of the present invention, contains at least one pentadecanoic acid in the molecule, an odd-chain fatty acid such as pentadecanoic acid has a function of maintaining the TCA cycle normally. Fatty acids are oxidized in the body and become two-carbon (C2) acetyl-CoA, which enters the citric acid cycle (TCA cycle), reducing the cofactors NAD (nicotinamide adenine dinucleotide) and FAD (flavin adenine dinucleotide) to $NADH_2$ and $FADH_2$, and producing ATP by the electron transfer system. Here, in the case of fatty acids having an even number of carbon atoms, all carbon chains are decomposed into C2 acetyl-CoA and used in the TCA cycle, but in the case of odd-chain fatty acids such as pentadecanoic acid, C3 propionyl-CoA remains at the end of the degradation.

Propionyl-CoA is converted to C4, methyl-malonyl-CoA, which is then converted to succinyl-CoA, a member of the TCA cycle, by the enzyme methylmalonyl-CoA mutase with vitamin B12 as a cofactor. The succinyl-CoA introduced into the TCA cycle is converted to succinate by the enzyme succinyl-CoA synthase. This reaction produces a signal transducer, GTP (guanosine triphosphate). In the TCA cycle, this is the only reaction that produces GTP. ATP is not produced in the TCA cycle.

GTP binds to membrane proteins called G-proteins to transduce signals, and GTP-bound active G-proteins play an important role in activating various physiological functions of cells. Therefore, it is suggested that odd-chain fatty acids are involved in ATP production starting from C2 acetyl-CoA as well as in the activation of cellular physiological functions starting from C3 propionyl-CoA.

Since the molecules that make up the TCA cycle are also implicated in various other metabolic pathways, the TCA cycle may not function adequately due to a lack of one of its components. In such a case, the TCA cycle is replenished with succinyl-CoA produced by the degradation of odd-chain fatty acids as described above (this phenomenon is called anaplerosis). Conversely, if there is an excess of molecules in the TCA cycle, a cataplerotic reaction occurs, in which one of the constituent molecules is removed, and the TCA cycle is maintained normally. Odd-chain fatty acids function to maintain the TCA cycle normally by replenishing succinyl-CoA via propionyl-CoA.

The active ingredient of the present invention has at least one, and preferably two or more of these odd-chain fatty acids, especially pentadecanoic acid, in its molecule, which is thought to promote insulin secretion and lead to normal blood glucose levels at the time of sugar appeal described below. In general, free fatty acids are toxic to cells, but the active ingredient of the present invention exists in the form of triglyceride, which is highly stable. Especially pentadecanoic acid triglyceride obtained from the genus *Aurantiochytrium* of *Labyrinthula* algae or the genus *Aurantiochytrium* of *Schizochytrium* algae, as described below, is a naturally occurring, highly stable form that is non-toxic. Therefore, it acts differently from pentadecanoic acid, an odd-chain (C15) saturated fatty acid as a free fatty acid, and is not toxic even when administered in large amounts, making it suitable as a health food or drug that provides an effective effect in lowering blood glucose levels.

In addition, when the pentadecanoic acid, an odd-chain (C15) saturated fatty acid, was added to a cell line derived from pancreatic β-cells to measure insulin secretion, as shown in Comparative Example 1 below, unlike the pentadecanoic acid triglyceride, no insulin secretion-promoting effect was observed. This indicates that the effect of promoting insulin secretion and returning blood glucose levels to normal was not observed with the pentadecanoic acid, which is a free fatty acid, but was observed with the pentadecanoic acid triglyceride. Such effects were first observed with the pentadecanoic acid triglyceride.

(Method for Producing Pentadecanoic Acid Triglyceride)

The pentadecanoic acid triglyceride, which is the active ingredient of the present invention, may be chemically synthesized or naturally occurring. Sources of naturally occurring pentadecanoic acid triglycerides include lipids produced in the body by living organisms, such as livestock and poultry fats, fish and shellfish oils, vegetable oils, or lipid-producing microorganisms. The genus *Aurantiochytrium* of *Labyrinthula* algae or *Schizochytrium* algae is particularly preferred because they are heterotrophic algae that live in brackish water and have the characteristic of assimilating nutrients in water to produce lipids and accumulate them in their cells.

For algae of the genus *Aurantiochytrium* or the genus *Schizochytrium*, it is preferable to use strains with an excellent ability to produce the desired triglycerides. Such algal strains may be naturally collected and isolated, cloned through mutation induction and screening, or established using genetic recombination technology. Although not particularly limited, for example, *Aurantiochytrium* Sp. strain SA-96, *Aurantiochytrium* Sp. strain NIES-3737, *Aurantiochytrium* strain NB6-3, *Aurantiochytrium* strain mh0192 and *Aurantiochytrium* strain mh1959 have the property of accumulating, in their cells, a large amount of triglycerides containing pentadecanoic acid (PDA), which is an odd-chain fatty acid, and those containing docosahexaenoic acid (DHA) and docosapentaenoic acid (DPA), which are highly unsaturated fatty acids. In addition, We, the inventors, have also found fat-producing strains that exceed specificities of above-mentioned strains in wild strains collected in nature, such as *Aurantiochytrium* sp. The effective use of these strains as microorganisms for the production of pentadecanoic acid triglycerides is particularly desirable.

The cultivation of the above *Aurantiochytrium* algae is carried out using methods established in the art. That is, ordinary maintenance culture is carried out according to established methods by seeding the algae into a medium with appropriately prepared components. The medium for cultivating *Aurantiochytrium* essentially contains salts, carbon sources, and nitrogen sources. In general, the so-called GTY medium (10-40 g/L of artificial seawater, 20-100 g/L of D(+)glucose, 10-60 g/L of tryptone, and 5-40 g/L of yeast extract) is used for culturing microalgae.

Carbon sources include sugars such as glucose, fructose, and sucrose. These carbon sources are added, for example, at a concentration of 20-120 g per liter of the medium.

The algae of the genus *Aurantiochytrium* is a marine algae, and an appropriate amount of artificial seawater is added to the culture medium. Preferably, the artificial seawater is added so that the final salinity of the culture medium is about 10% (v/v) to about 100% (v/v) of seawater (salinity 3.4% (w/v)), e.g., salinity is about 1.0% to 3.0% (w/v).

In general, various nitrogen sources can be added to the culture medium of microalgae, such as organic nitrogen such as monosodium glutamate and urea, or inorganic nitrogen such as ammonium acetate, ammonium sulfate, ammonium chloride, sodium nitrate, ammonium nitrate, etc., or biogenic digests such as yeast extracts, cornstarch liquor, polypeptone, peptone, and tryptone. In particular, cell extracts obtained by extracting liquid components from various animal cells are preferred as nitrogen sources to be added to the medium used for culturing algae of the genus *Aurantiochytrium*. The use of cell extracts, which are rich in nutrients such as cell-derived amino acids, nucleic acids, vitamins, and minerals, and are available at low cost, is extremely advantageous when cells must be mass cultured on an industrial scale to obtain cultured cell products.

However, when using a medium prepared on the basis of cell extracts as described above, the ratio of odd-chain fatty acids in the triglycerides produced by the cultured algae was significantly reduced, and therefore the cell extracts could not be used as a nitrogen source for the medium when efficiently producing the object of the present invention. Therefore, the present inventors found that the production of odd-chain fatty acids dramatically increased when *Aurantiochytrium* algae were cultured in an algae culture medium prepared by adding cell extracts treated with strong acid, compared to the case where cell extracts without such treatment were added. The method for producing triglycerides containing odd-chain fatty acids as a major component has already been reported (JP 2017-063633 A).

Furthermore, in one preferred embodiment of the invention, the basic medium for cultivating algae of the genus *Aurantiochytrium* is a medium with 2% or more glucose, 0.5-4% monosodium glutamate, 0.1-2% yeast extract, 1-3.3% sea salt, and 2-20% whey (animal or vegetable) supplemented with 0 to 50 mM of valine and 0 to 50 mM of sodium propionate. Animal or vegetable whey is preferably tofu whey (soybean whey). To this basic medium, add 2% or more of a culture of *Aurantiochytrium* that has been pre-cultured for 72 hours at 20-30° C. with 2% or more glucose, 0.5-4% monosodium glutamate, 0.1-2% yeast extract, 1-3.3% sea salt, and 2-20% whey (animal or vegetable). The *Aurantiochytrium*-added culture medium is aerated and gently agitated, and incubated for 48 to 200 hours at 20 to 30° C. and pH of 5.0 to 8.5 (use 1.0M NaOH solution for pH adjustment). After culturing, *Aurantiochytrium* cells that produced pentadecanoic acid triglyceride can be recovered by centrifugation (see the specification of JP Patent Application No. 2018-171739).

The pellets collected from the culture medium obtained by the above method by centrifugation or filtration are dried by freeze-drying or drying by heating. Alternatively, the medium in which the algal cells are suspended after cultivation may be used directly for the triglyceride extraction step. Extraction may be carried out multiple times using different organic solvents. As organic solvents, mixtures of polar and weakly polar solvents such as n-hexane/ethanol mixtures, chloroform/methanol mixtures, or ethanol/diethyl ether mixtures can be used. The obtained extracts are purified by methods known to those skilled in the art.

As a method for separating triglycerides, a fractionation method known to those skilled in the art is adopted. Separation and purification may be performed using various physicochemical properties such as the polarity of the triglyceride molecule to be fractionated, the solubility in a solvent, the melting point, the specific gravity, and the molecular weight, and column chromatography technology is preferably used. The conditions for the means of separating the triglycerides can be set by the normal condition study of the person skilled in the art, depending on the composition of the triglyceride mixture and the type of triglyceride to be fractionated.

The algae of the genus *Aurantiochytrium* can synthesize and accumulate both odd-chain fatty acid triglycerides and highly unsaturated fatty acid triglycerides intracellularly. Therefore, hexane or ethyl acetate is added to the obtained *Aurantiochytrium* cells to extract lipids, then hydrogen peroxide solution is added to this lipid solution (water is added if necessary), and unsaturated fatty acids are oxidized and decomposed by venting ozone at room temperature. After completion of the reaction, the oxide is removed with sodium hydrogen carbonate and sodium carbonate or an ion exchange resin to obtain pentadecanoic acid triglyceride that precipitates as the temperature decreases. The composition of the purified pentadecanoic acid triglyceride can be analyzed by gas chromatography, mass spectrometry and the like.

(Insulin Secretion-Promoting Agent)

The insulin secretion-promoting agent, insulin secretion-promoting agent, of the first aspect of the invention is a pharmaceutical preparation which has an insulin-secreting action during hyperglycemia.

With respect to certain pharmaceuticals, if taken steadily when blood glucose (glucose concentration) is high, they can secrete insulin and lower blood glucose levels regardless of blood glucose levels. However, if the action is sustained even when blood glucose levels may fall, sustained insulin secretion will lower blood glucose levels more than necessary, leading to the risk of hypoglycemia. The pentadecanoic acid triglyceride according to the present invention acts only when a postprandial elevation of blood glucose level is observed, promoting insulin secretion and maintaining a normal postprandial blood glucose level, which can prevent and/or improve diabetes.

It can then be used to prevent or ameliorate disorders (diseases) and age-related changes manifested by elevated blood glucose levels, such as microangiopathy (retinopathy, nephropathy, neuropathy) and macroangiopathy (cerebrovascular disease, coronary artery disease, occlusive artery disease in legs).

Diabetic retinopathy is a disease that causes hemorrhage, leukodermia, retinal edema and the like due to vascular disorder in the retina, which in advanced stages leads to a severe visual impairment. Diabetic nephropathy is a disease that causes proteinuria and impaired renal function due to damage to the glomeruli, which are rich in blood vessels. Diabetic neuropathy is the most common complication of diabetes mellitus, which mainly affects the peripheral nerves of the legs and autonomic nerves. Good blood glucose control is also important to prevent such neuropathy. Diabetes mellitus also increases the risk of atherosclerosis (macroangiopathy) in large blood vessels such as the coronary arteries of the heart and cerebral vessels, triggering life-threatening diseases such as myocardial infarction and stroke. Stroke, myocardial infarction, and blood circulation problems in the legs are two to three times more frequent in diabetic patients.

The application of the insulin secretion-promoting agent is also not limited and can be set according to the purpose. For example, it can be used as a pharmaceutical such as a blood glucose ameliorating agent or a diabetes ameliorating agent.

(Pharmaceuticals)

The blood glucose improving agent according to the second aspect of the present invention and the pharmaceutical product which is a diabetes improving agent according to the third aspect of the present invention contain the pentadecanoic acid triglyceride represented by the above formula (I) as an active ingredient, and can be used to improve the blood glucose level at the time of sugar intake or to improve symptoms of diabetes in type 2 diabetes and the like, and are useful as pharmaceutical products for such purposes. Herein, "pharmaceutical product" means a therapeutic drug for diabetics whose insulin secretion is no longer timely and who do not require treatment such as insulin intake, etc., by maintaining normal blood glucose levels.

When preparing pharmaceutical products by containing the pentadecanoic acid triglyceride represented by the above formula (I), any pharmaceutically acceptable auxiliary agents, for example, sugars such as dextrin and starch; proteins such as gelatin, soy protein, and corn protein; amino acids such as alanine, glutamine, and isoleucine; polysaccharides such as cellulose and gum arabic; and fats and/or oils such as soybean oil and medium-chain fatty acid triglycerides, etc., may be added to formulate the product into any desired dosage form.

The amount of pentadecanoic acid triglyceride represented by the above formula (I) in the pharmaceutical product is not particularly limited, but it is preferably adjusted so that the intake of pentadecanoic acid triglyceride per adult per day, which is an effective concentration, is about 10 to 1000 mg per day.

(Foods)

The food product according to the fourth aspect of the present invention contains pentadecanoic acid triglyceride represented by the above formula (I) as an active ingredient, and can be used to improve elevated blood glucose levels, and is useful as a health food for that purpose. Here, "health food" means food or drink intended to improve the state in which postprandial blood glucose level is difficult to lower, and refers to "health food" in a broad sense, including food with functional claims under the "food with health claims system" or food for specified health uses, etc., that meet the standards for safety and efficacy, etc. established by the government.

The health food may be a combination of any foods or drinks, or it may be a dietary supplement with the main ingredient of the present invention for people with elevated blood glucose levels.

In the manufacture of the food product containing pentadecanoic acid triglyceride represented by formula (I) above, for example, sugars such as dextrin and starch; proteins such as gelatin, soy protein, and corn protein; amino acids such as alanine, glutamine, and isoleucine; polysaccharides such as cellulose and gum arabic; oils and fats such as soybean oil and medium-chain fatty acid triglycerides can be added to formulate any desired dosage form.

The amount of pentadecanoic acid triglyceride represented by the above formula (I) in the food product of the present invention is not particularly limited, but it is preferably adjusted so that the intake of pentadecanoic acid triglyceride per adult per day is about 1 to 1000 mg per day, considering the general intake of the food product to which the triglyceride is added.

Specific examples of the above-mentioned food product include, for instance, beverages such as soft drinks, carbonated drinks, nutritional drinks, fruit drinks, and lactic acid drinks (including concentrates of these beverages and powders for adjustment); ice confections such as ice cream, ice sherbet, and shaved ice; noodles such as soba, udon, harusame, gyoza skin, siumai skin, chinese noodles, and instant noodles; confectionery such as sweet, candy, gum, chocolate, snacks, cookies, jelly, jam, cream, baked goods; processed marine and livestock products such as fish paste, ham, sausage; dairy products such as processed milk, fermented milk; fats and oils and processed foods thereof such as salad oils, tempura oils, margarines, mayonnaises, shortenings, whipped creams, dressings; seasonings such as sauces and bastes; health and nutritional supplements in various forms such as tablets and granules; others such as soups, stews, salads, prepared foods, and pickles.

The food product according to the present invention may contain various food additives, such as antioxidants, flavors, various esters, organic acids, organic acid salts, inorganic acids, inorganic acid salts, inorganic salts, dyes, emulsifiers, preservatives, seasonings, sweeteners, acidifiers, fruit juice extracts, vegetable extracts, nectar extracts, pH adjusters, quality stabilizers, and the like, alone or in combination.

The concentration of pentadecanoic acid triglyceride in the beauty food or drink according to the present embodiment is about 0.00001 to 100% by mass (hereinafter referred to as "%") as a solid content, and preferably 0.0005 to 50% to obtain usability and good effects.

EXAMPLE

Next, the present invention will be described in more detail with reference to Examples, but the present invention is not limited to these examples.

(Production Example 1) Production of Pentadecanoic Acid Triglyceride Using *Aurantiochytrium*

*Aurantiochytrium*, strain mh1959 (purchased from Professor Masahiro Hayashi, Faculty of Agriculture, Miyazaki University) was pre-cultured at 25° C. for 72 hours using a medium containing 3.6% glucose, 0.5% monosodium glutamate, 0.2% yeast extract, 1% seawater salt, and 10% whey. This was added to the following basal medium to make it 2% and gently agitated with air. 1 kg of basal medium was prepared by adding 50 mM valine and 25 mM sodium propionate to a medium containing 3.6% glucose, 0.5% monosodium glutamate, 0.2% yeast extract, 1% sea salt, and 10% whey. The culture medium was maintained at 25° C., pH 7.40-7.75 (1.0 M NaOH solution was used for pH adjustment) and incubated for 72-96 hours.

After incubation, the algae were centrifuged at 3000 rpm for 15 minutes and about 20 g of algae were collected. The lipids were extracted by adding hexane or ethyl acetate to 20 g of the obtained algae. Hydrogen peroxide solution was added to the extracted lipid solution (water was added as necessary), and ozone was vented at room temperature. After the reaction was completed, the oxides were removed using sodium bicarbonate, sodium carbonate, or ion exchange resin, and 2 g of pentadecanoic acid triglyceride was obtained, which precipitated as the temperature decreased.

(Composition Analysis of Pentadecanoic Acid Triglyceride)

Methyl ester of fatty acid (FAME) was obtained by adding 0.50 mL of 14% $BF_3$-methanol and 0.25 mL of methyl acetate to the lipid containing pentadecanoic acid triglyceride obtained in Production Example 1 and heated at 70° C. for 30 min. Exactly 1.0 mL of n-hexane and 5 mL of saline were added to the reaction solution and mixed vigorously. The mixture was centrifuged at 2800 rpm for 10 min, and the n-hexane layer was used as the sample for gas chromatography.

The above samples were analyzed using a Shimadzu GC-2025 gas chromatograph system. The analysis conditions were as follows: Agilent J&W GC column DB-23 (30 m×0.25 mm) was used, 1 μL sample was injected and detected by FID (hydrogen flame ionization detector) with carrier gas (He, 14 psi). The molecular species of FAME was identified based on the retention time of the fatty acid methyl ester standard product (manufactured by GL Science Co., Ltd.). The fatty acid composition was determined from the area ratio. The obtained component ratios are mass ratios. The ratio of odd-chain fatty acids was determined by multiplying the total amount of fatty acids by the respective ratio (%) of odd-chain fatty acids (C13, C15, C17). The results obtained are shown in Table 1 below.

TABLE 1

| Fatty acid | Retention time (min) | Peak area | Ratio (mass %) |
|---|---|---|---|
| C11:0 | 7.939 | 2207 | 0.3 |
| C12:0 | 8.483 | 2735 | 0.3 |
| C13:0 | 9.065 | 39249 | 5.3 |
| C14:0 | 9.715 | 99919 | 13.4 |
| C15:0 | 10.461 | 422015 | 56.7 |
| C16:0 | 11.291 | 134108 | 18.0 |
| C17:0 | 12.23 | 44681 | 6.0 |

From the results shown in Table 1, the content of odd-chain fatty acids in the triglyceride obtained in Production Example 1 was 68.3% by mass. The fatty acids that make up the triglycerides were found to be mainly pentadecanoic acid residues (C15) and palmitic acid residues (C16).

(Mass Spectrometry of Pentadecanoic Acid Triglyceride)

Lipids containing pentadecanoic acid triglyceride obtained in Production Example 1 were analyzed by mass spectrometry using a Thermo Fischer Orbitrap mass spectrometer Exactive Plus (AMR DART ion source). The results are shown in Table 2 below.

TABLE 2

| Total carbon number of acyl groups | tR | Area(%) | m/z | Relative Intensity | fragment(%) | Assignment |
|---|---|---|---|---|---|---|
| | 33.2 | 18.8 | 768.7079 | 86.62 | 0 | M + NH4 |
| | | | 495.441 | 14.25 | 8.626952 | M − C16 |
| C14•C15•C15 | | | 509.4569 | 100 | 60.540017 | M − C15 |
| | | | 523.4725 | 44.26 | 26.795012 | M − C14 |
| | | | 537.4882 | 6.67 | 4.038019 | M − C13 |
| | | | 551.5039 | 0 | 0 | M − C12 |
| | 38.6 | 30.6 | 782.7241 | 91.24 | 0 | M + NH4 |
| | | | 509.4567 | 19.87 | 14.877209 | M − C16 |
| C15•C15•C15 | | | 523.4726 | 100 | 74.872716 | M − C15 |
| | | | 537.4877 | 13.69 | 10.250075 | M −C14 |
| | 46 | 22.3 | 796.7401 | 100 | 0 | M + NH4 |
| | | | 509.4566 | 6.21 | 5.607730 | M − C17 |
| C16•C15•C15 | | | 523.4725 | 41.7 | 37.655770 | M − C16 |
| | | | 537.4882 | 58.44 | 52.772259 | M − C15 |
| | | | 551.5033 | 4.39 | 3.964241 | M − C14 |
| | 55.8 | 11.7 | 810.7554 | 100 | 0 | M + NH4 |
| C17•C15•C15 | | | 523.4721 | 35.42 | 19.954930 | M − C17 |
| C16•C16•C15 | | | 537.4878 | 65.54 | 36.923944 | M − C16 |
| | | | 551.5035 | 71.82 | 40.461972 | M −C15 |
| | | | 565.5186 | 4.72 | 2.659155 | M − C14 |

The results in Table 2 show that the pentadecanoic acid triglyceride obtained in Production Example 1 contains mainly a triglyceride formed only with pentadecanoic acid residues (C15) and another triglyceride containing two units of pentadecanoic acid residues (C15) and one unit of myristic acid residue (C14), based on the fragment composition of the major mass spectral peak (molecular weight 750).

Further, the fragment composition of the mass spectral peak (molecular weight 764) indicates that it contains mainly the triglyceride formed only with pentadecanoic acid residues (C15).

Furthermore, the fragment composition of the mass spectral peak (molecular weight 778) indicates that it contains mainly the triglyceride formed only with pentadecanoic acid residues (C15) and another triglyceride containing two units of pentadecanoic acid residues (C15) and one unit of palmitic acid residue (C16).

(Example 1) Verification of the Safety of Pentadecanoic Acid Triglyceride

The following experiments were conducted to verify the safety of pentadecanoic acid triglyceride.

Test Method

Pentadecanoic acid triglyceride at concentrations of 1, 10, and 100 µg/mL were added in vitro to cell lines derived from mouse pancreatic @-cells.

Separately, as controls, ethanol at concentrations of 0.01%, 0.1%, and 1% (v/v) were added to the cells.

After 24 hours, cell viability was measured by using WST reagent.

Test Results

Figure 1:
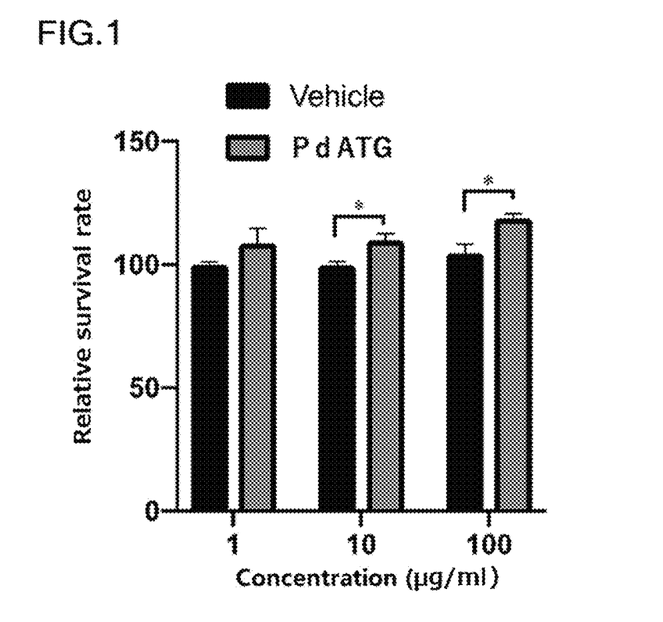
FIG. 1 is a graph showing the safety of pentadecanoic acid triglyceride on cell viability of a cell line derived from mouse pancreatic β-cells.

The results obtained are shown in FIG. 1.

As shown in FIG. 1, the pentadecanoic acid triglyceride was not toxic at all up to an added dose of 100 µg/mL.

Further, with respect to the pentadecanoic acid triglyceride at concentrations of 10 µg/mL and 100 µg/mL, the cell proliferation was rather enhanced.

From these points of view, the pentadecanoic acid triglyceride proved to be a safe component for cells that express function.

(Example 2) Examination of the Effect of Pentadecanoic Acid Triglyceride on the Promotion of Insulin Secretion The following experiments were conducted to examine the effect of pentadecanoic acid triglyceride on the promotion of insulin secretion.

Test Method

Low- and high-glucose Ringer's solutions in the presence of 10 µg/mL pentadecanoic acid triglyceride were added in vitro to cell lines derived from mouse pancreatic β-cells. The cells were then stimulated for 30 minutes.

Separately, as a control, ethanol at concentration of 0.1% (v/v) were added to the cells.

Insulin secreted into the culture medium was measured by ELISA.

Test Results

Figure 2:
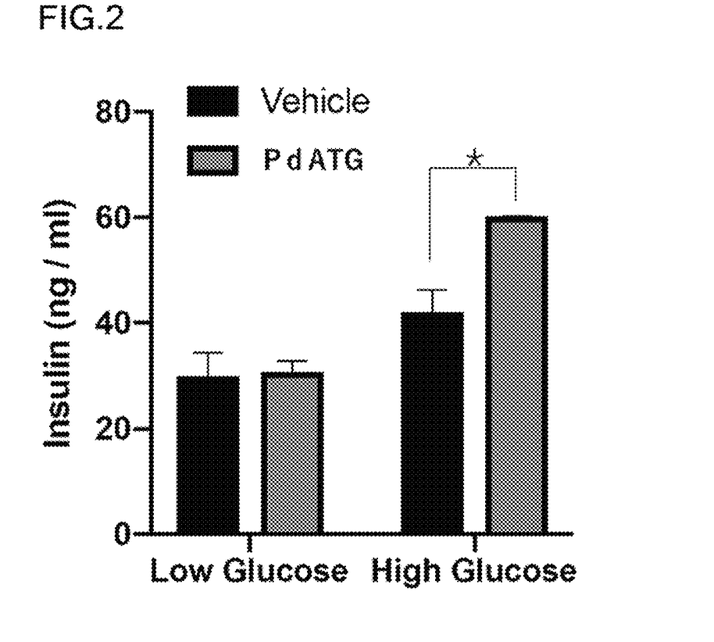
FIG. 2 shows the results of the study of the effect of pentadecanoic acid triglyceride on insulin secretion promotion in a cell line derived from mouse pancreatic β-cells.

The results obtained are shown in FIG. 2.

As shown in FIG. 2, the low glucose solution showed no effect of the pentadecanoic acid triglyceride on insulin secretion, whereas the high glucose solution showed an effect of the pentadecanoic acid triglyceride on insulin secretion.

These results indicate that the pentadecanoic acid triglyceride is an ideal blood glucose suppressant, effective in stimulating insulin secretion when blood glucose level is high.

Incidentally, in the case of drugs that simply lower blood glucose levels, lowering normoglycemia can produce morbid symptoms such as loss of concentration, lethargy, irritability, and restlessness. As such symptoms progress, symptoms such as headache, nausea, dizziness, and cold sweats may appear, and if the symptoms progress further, the patient may fall into a coma or other dangerous conditions.

In contrast, in the case of the pentadecanoic acid triglyceride, it has been found that such a risk does not occur, making it an ideal hyperglycemic ameliorant. Thus, the pentadecanoic acid triglyceride has been found to be an ideal blood glucose ameliorant, diabetes ameliorant, and food product.

(Comparative Example 1) Examination of the Effect of Pentadecanoic Acid on the Promotion of Insulin Secretion For comparison, the following experiment was conducted to examine the effect of pentadecanoic acid on the promotion of insulin secretion.

Test Method

Figure 3:
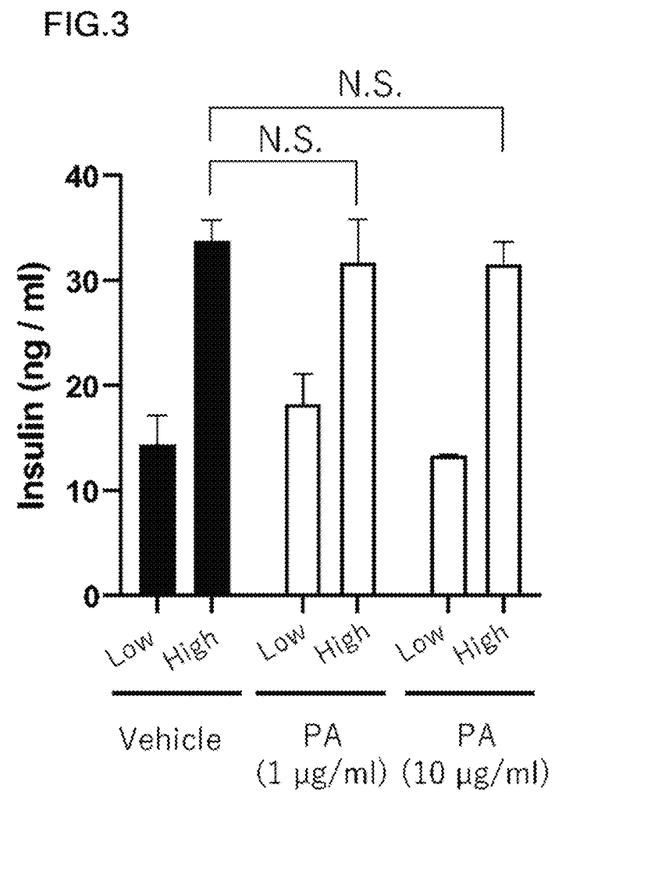
FIG. 3 shows the results of a comparative study of the effect of pentadecanoic acid on insulin secretion promotion in a cell line derived from mouse pancreatic beta cells (no promotion effect).

Low- and high-glucose Ringer's solutions in the presence of 1 µg/mL or 10 µg/mL pentadecanoic acid (PA in the Figure) were added in vitro to cell lines derived from mouse pancreatic β-cells. The cells were then stimulated for 30 minutes.

Separately, as a control, ethanol at concentration of 0.1% (v/v) were added to the cells.

Insulin secreted into the culture medium was measured by ELISA.

Test Results

The results obtained are shown in FIG. 3.

As shown in FIG. 3, the pentadecanoic acid showed no effect on insulin secretion at any concentration.

The results of Example 2 and Comparative Example 1 show that the effect of promoting insulin secretion and returning blood glucose levels to normal in a model with high blood glucose level was the first effect observed in the pentadecanoic acid triglyceride.

The invention claimed is:

1. An insulin secretion-promoting agent comprising, as an active ingredient, a triglyceride represented by the following formula (I):

the triglyceride represented by formula (I) comprising:
a first triglyceride represented by formula (I) wherein $R^1$, $R^2$ and $R^3$ all denote pentadecanoic acid residues, and
a second triglyceride represented by formula (I) wherein any two of $R^1$, $R^2$ and $R^3$ are pentadecanoic acid residues and another is a myristic acid residue or a palmitic acid residue.

2. The insulin secretion-promoting agent according to claim 1, wherein the triglyceride represented by formula (I) is derived from algae of the genus *Aurantiochytrium* or *Schizochytrium*.

3. A blood sugar level improver comprising the triglyceride represented by formula (I) of claim 1.

4. A pharmaceutical product comprising the triglyceride represented by formula (I) of claim 1.

5. A food product comprising the triglyceride represented by formula (I) of claim 1.

6. A method for improving blood sugar level in a subject in need thereof, comprising administering to the subject a composition containing a therapeutically effective amount of triglyceride represented by the following formula (I):

the triglyceride represented by formula (I) in the composition comprising:

a first triglyceride represented by formula (I) wherein $R^1$, $R^2$ and $R^3$ all denote pentadecanoic acid residues, and a second triglyceride represented by formula (I) wherein any two of $R^1$, $R^2$ and $R^3$ are pentadecanoic acid residues and another is a myristic acid residue or a palmitic acid residue.

7. A method for treating diabetes in a subject in need thereof, comprising administering to the subject a composition containing a therapeutically effective amount of triglyceride represented by the following formula (I):

(I)

the triglyceride represented by formula (I) in the composition comprising:

a first triglyceride represented by formula (I) wherein $R^1$, $R^2$ and $R^3$ all denote pentadecanoic acid residues, and a second triglyceride represented by formula (I) wherein any two of $R^1$, $R^2$ and $R^3$ are pentadecanoic acid residues and another is a myristic acid residue or a palmitic acid residue.

8. The method for improving blood sugar level according to claim 6, wherein the composition is a food composition.

* * * * *